United States Patent [19]
Marshall et al.

[11] Patent Number: 5,706,061
[45] Date of Patent: Jan. 6, 1998

[54] SPATIAL LIGHT IMAGE DISPLAY SYSTEM WITH SYNCHRONIZED AND MODULATED LIGHT SOURCE

[75] Inventors: Stephen W. Marshall, Richardson; Austin L. Huang, Dallas, both of Tex.

[73] Assignee: Texas Instruments Incorporated, Dallas, Tex.

[21] Appl. No.: 414,707

[22] Filed: Mar. 31, 1995

[51] Int. Cl.$^6$ .................................................. H04N 9/12
[52] U.S. Cl. ........................................... 348/743; 348/742
[58] Field of Search ..................................... 348/742, 743, 348/655–658, 70, 68, 268–270, 755, 764, 771, 720; H04N 9/31, 9/30, 9/12

[56] References Cited

U.S. PATENT DOCUMENTS

| | | | |
|---|---|---|---|
| H1320 | 6/1994 | Kieronski | 348/739 |
| 4,090,219 | 5/1978 | Ernstoff et al. | 348/742 |
| 4,546,379 | 10/1985 | Sarofeen et al. | 348/70 |
| 5,061,049 | 10/1991 | Hornbeck | 359/224 |
| 5,079,544 | 1/1992 | DeMond et al. | 340/701 |
| 5,101,236 | 3/1992 | Nelson et al. | 355/229 |
| 5,105,369 | 4/1992 | Nelson | 364/525 |
| 5,168,406 | 12/1992 | Nelson | 359/855 |
| 5,192,946 | 3/1993 | Thompson et al. | 340/794 |
| 5,231,388 | 7/1993 | Stoltz | 340/783 |
| 5,233,385 | 8/1993 | Sampsell | 355/35 |
| 5,240,818 | 8/1993 | Mignardi et al. | 430/321 |
| 5,278,652 | 1/1994 | Urbanus et al. | 358/160 |
| 5,312,779 | 5/1994 | Nelson | 437/225 |
| 5,313,479 | 5/1994 | Florence | 372/26 |
| 5,347,321 | 9/1994 | Gove | 348/663 |
| 5,365,283 | 11/1994 | Doherty et al. | 348/743 |
| 5,371,543 | 12/1994 | Anderson | 348/270 |
| 5,386,250 | 1/1995 | Guerinot | 348/735 |

*Primary Examiner*—Michael Lee
*Attorney, Agent, or Firm*—Robert C. Klinger; James C. Kesterson; Richard L. Donaldson

[57] ABSTRACT

A color image display system (10, 110, 120, 150) having a lamp power supply (78, 134, 152) switching rate being a multiple of, and synchronized to, a video frame rate. An AC component of a lamp driving waveform which may cause variations in intensity of the lamp output is synchronized to the video frame rate. Synchronizing the lamp power supply switching rate to the frame rate stops the beating and rolling of color bands in the video frame that may be produced by a ripple in light intensity. An odd number of switching cycles per two frame periods is chosen to alternate the phase of the ripple pattern frame-to-frame for ripple cancellation through integration. The lamp driving waveform may be amplitude modulated (90) to balance a lamp (14) that has spectral deficiencies. A DMD spatial light modulator (26) is utilized to modulate the colored light and generate a light image on a display (42) in either a sequential, or non-sequential image display system.

31 Claims, 9 Drawing Sheets

SPATIAL LIGHT IMAGE DISPLAY SYSTEM WITH SYNCHRONIZED AND MODULATED LIGHT SOURCE

CROSS REFERENCE TO RELATED APPLICATIONS

Cross reference is made to the following co-pending patent applications, each being assigned to the same assignee as the present invention and the teaching included herein by reference:

| U.S. SER. NO. | TITLE | FILING DATE |
| --- | --- | --- |
| 08/179,028 | Method and Apparatus for Sequential Color Imaging | 01/07/94 |
| 08/146,385 | DMD Display System | 11/01/93 |
| 08/221,739 | Illumination Control Unit for Display System with Spatial Light Modulator | 03-31-94 |
| 08/371,348 | DMD Illuminator Switch | 01/11/95 |
| 08/373,692 | Monolithic Programmable Digital Micro-Mirror Device | 01/17/95 |

FIELD OF THE INVENTION

This invention relates generally to image display systems such as those including a spatial light modulator, and more particularly to a method and apparatus for performing sequential color imaging.

BACKGROUND OF THE INVENTION

Spatial Light Modulators (SLMs) are widely used in the industry for video monitors, graphic displays, projectors, and hard copy printers. SLMs are devices that modulate incident light in a spatial pattern corresponding to an electrical or optical input. The incident light may be modulated in its phase, intensity, polarization, or direction. This light image is directed and focused to a screen in the case of a projector, video monitor or display, or is ultimately focused on a light sensitive material, such as a photoreceptor drum, in the case of a xerographic printer.

The light modulation may be achieved by a variety of materials exhibiting various electro-optic or magneto-optic effects, and by materials that modulate light by surface deformation. Other spatial light modulators may include tiny micro-mechanical devices comprising an array of positionable picture elements (pixels). The light image can be colored if it is to be displayed on a screen of a projector, monitor, or a television and the like. This coloring is typically done in one of two ways, either using non-sequential color systems, or using sequential color systems. A non-sequential color system simultaneously generates multiple colors of light, such as red, green and blue light. An example of a non-sequential color system is discussed in commonly assigned co-pending patent application Ser. No. 08/146,385, filed Nov. 1, 1993, entitled "DMD Display System", the teachings included herein by reference. In sequential color systems, color images are generated by sequentially projecting colored light, i.e. red, green and blue light, in a single image frame, which typically lasts 1/60 of a second. Sequential color systems typically utilize a color wheel that is partitioned into a plurality of color of segments, such as a red, green, and blue segment, or multiples/combinations thereof. An example of a sequential color system is disclosed in commonly assigned co-pending patent application Ser. No. 08/179,028, the teachings included herein by reference.

A recent innovation of Texas Instruments Inc. of Dallas, Tex. is an SLM imaging system using an array of individual micro-mechanical elements, known as a digital micromirror device (DMD), also referred to as a deformable mirror device. The DMD is a spatial light modulator suitable for use in displays, projectors and hard copy printers. The DMD is a monolithic single-chip integrated circuit, comprised of a high density array of 17 micron square deflectable micromirrors. These mirrors are fabricated over address circuitry including an array of SRAM cells and address electrodes. Each mirror forms one pixel of the DMD array and is bi-stable, that is to say, stable in one of two positions. A source of light directed upon the mirror array will be reflected in one of two directions by each mirror. In one stable "on" mirror position, incident light to that mirror will be reflected to a collector lens and focused on a display screen or a photosensitive element of a printer, and forms an image of the mirror/pixel. In the other "off" mirror position, light directed on the mirror will be deflected to a light absorber. Each mirror of the array is individually controlled to either direct incident light into the collector lens, or to the light absorber. In the case of a display, a projector lens and a light prism ultimately focus and magnify the modulated light image from the pixel mirrors onto a display screen and produce a viewable image. If each pixel mirror of the DMD array is in the "on" position, the displayed image will be an array of bright pixels.

For a more detailed discussion of the DMD device, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image can be achieved by pulse width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

In non-sequential color systems, three (3) DMD arrays can be used in parallel, one each for red, green, and blue light, as disclosed in the commonly assigned co-pending patent application Ser. No. 08/146,385, filed Nov. 1, 1993, titled "DMD Display System", the teachings of which are included herein by reference. In contrast, a sequential color system requires only one such DMD device, with the red, green, and blue light being sequentially reflected by the single DMD array to a screen. The need for three such arrays in the non-sequential color system triples the requirement for the DMD arrays, and attendant hardware over the sequential color system, but offers increased display brightness. Thus, there is a trade off between the complexity, cost and performance of a non-sequential color system when viewed against a sequential color system.

In the case of a sequential color system, a single light source is typically used, such as disclosed in U.S. Pat. No. 5,101,236 to Nelson, et al, entitled "Light Energy Control System and Method of Operation", assigned to the same assignee as the present invention and the teachings of which are included herein by reference. These lamps may typically be comprised of a xenon or metal halide arc lamp, or lasers. This arc lamp may be powered by an AC or DC power source.

In display systems, the video frame rate or refresh rate of the display is typically 60 hertz (Hz), or 60 frames a second. When an AC driven lamp is utilized, which is typically operated from a 60 hertz power source, the switching frequency of the lamp power supply "beats" with the video frame rate, degrading the image by causing a noticeable effect of brightness variations due to a power supply ripple roll through the video frame. When a DC light source is used, an AC ripple component is sometimes generated and carried by the DC driving signal due to rectification of the AC signal. This switching frequency also generates brightness variations of the lamp output. The problem is worse in field sequential color systems where the power supply ripple causes color shift bands to roll through the video frame. Another problem with using conventional lamps as a light source in field sequential color systems is color imbalance. This color imbalance is caused by lamps that are deficient in intensity in some portion of the color spectrum.

It is desirable to provide a color image display system whereby color shift bands are not rolling through the video frame. Another technical problem to be addressed is the reduction of color imbalance.

SUMMARY OF THE INVENTION

The image display system of the present invention achieves technical advantages by synchronizing a light source with its driving waveform having a component switching at a frequency being a multiple of a color wheel frequency to avoid beating or rolling color bands through the video frame. The intensity of the light source is modulated as a function of the color wheel position to overcome color imbalance and compensate for lamps that are deficient in some portion of the color spectrum.

In the preferred embodiment of the present invention, a sequential image display system is comprised of a driver circuit driving a light source with its driving waveform having a component switching at a first frequency, and a rotatable color wheel having multiple color segments transmitting and coloring the light. The color wheel rotates at a second frequency to sequentially position the color segments before the light source. A spatial light modulator modulates the colored light, and a control circuit synchronizes the driving waveform first frequency at a multiple of the color wheel second frequency. By driving the light source with a waveform having a component switching at a frequency higher than the color wheel frequency, and at a multiple thereof, preferably an odd multiple, color shift bands are not visible rolling through a video frame. This is achieved by coordinating the light source waveform switching frequency with the color wheel frequency to avoid beating. By operating the light source waveform switching frequency at an odd multiple of the color wheel frequency, odd harmonics are cancelled due to the phase shift of the light output every cycle (frame-to-frame) through integration performed by the human eye.

In the preferred embodiment, the light source generates the light with an intensity being a function of a first input, whereby the control circuit generates this first input. This first input is variable, and is generated as a function of which color segment of the wheel is coloring the light. For instance, a typical lamp is deficient in red light, and being the most sufficient in green light. By driving the lamp at 100% power when the red segment is before the light source, at 90% when the blue segment is before the light source, and 80% when the green segment is before the light source, color balance is achieved.

The control circuit preferably comprises a device providing the first input, with the lamp driver circuit driving the light source as a function of this first input. The device has a device input, and generates the first input as a function of a wheel position signal provided to this device input. A wheel position sensor generates this wheel position signal as a function of the color wheel position, such as by sensing a wheel index marker.

The control circuit comprises a synchronization circuit synchronizing the driving waveform first frequency to the color wheel second frequency. This synchronization circuit preferably comprises a phase-locked control circuit providing a sync output, but could also comprise, for instance, a sequence generator. This phase-locked control circuit preferably comprises a voltage controlled oscillator phase-locked to the color wheel. A memory device provides the first input as a function of the sync output. The lamp driver circuit drives the light source with a driver signal at the first frequency as a function of the first input. This lamp driver circuit varies the amplitude of the lamp driver signal as a function of the first input. Preferably, an address counter and read only memory (ROM) device are utilized, whereby the counter counts as a function of the VCO sync output. The ROM serves as a look-up table to amplitude modulate the lamp driver signal as a function of the counter count. In the preferred embodiment, the driving waveform first frequency is an odd multiple of the color wheel second frequency, divided-by-two. This causes a phase shift frame-to-frame of a frozen color roll, which is then cancelled by integration of the human eye. Ideally, the light source driving waveform first frequency is 630 hertz, and the color wheel second frequency is 60 hertz, and the VCO runs at 1260 hertz.

In alternative embodiments, a DC powered arc lamp, laser, or LED(s) may be utilized whereby the switching rate of the power supply driving these DC powered light sources is synchronized to, and a integer multiple divided-by-two, the video frame rate. Thus, any AC ripple in the DC driving waveform derived from rectification of the switching rate, which may create intensity variations of the light source, alternates phases frame-to-frame for sequential like colors. Color bands in the video frame are thus cancelled through integration of the eye. Three colored lasers or LEDs are sequentially driven and are functional equivalents of the color wheel to provide colored light illuminating the spatial light modulator.

Two or more spatial light modulators could be used in a non-sequential color imaging system, each modulator having an associated light source controlled according to the present invention, to avoid color bands and achieve color balance. Hence, limitation to a sequential color imaging system is not to be inferred.

In summary, color shift bands do not roll through the video frame, and are canceled through integration if any are generated, by synchronizing the frequency of the component of the light source driving waveform at a higher and multiple frequency of the color wheel, preferably an odd multiple, thereof. Color imbalance is eliminated, by modulating the intensity of the light source as a function of which color wheel segment is coloring the light source, even when using a light source, such as a metal halide or xenon arc lamp, which is deficient in one region of the visible spectrum.

DETAIL DESCRIPTION OF THE PREFERRED EMBODIMENT

While the present invention is described in considerable detail with regards to a DMD-type SLM image display system for purposes of illustration and clarity, limitation thereto is not to be inferred for the present invention is applicable to other SLM image display systems including, but not limited to, LCD image display systems.

Figure 1:
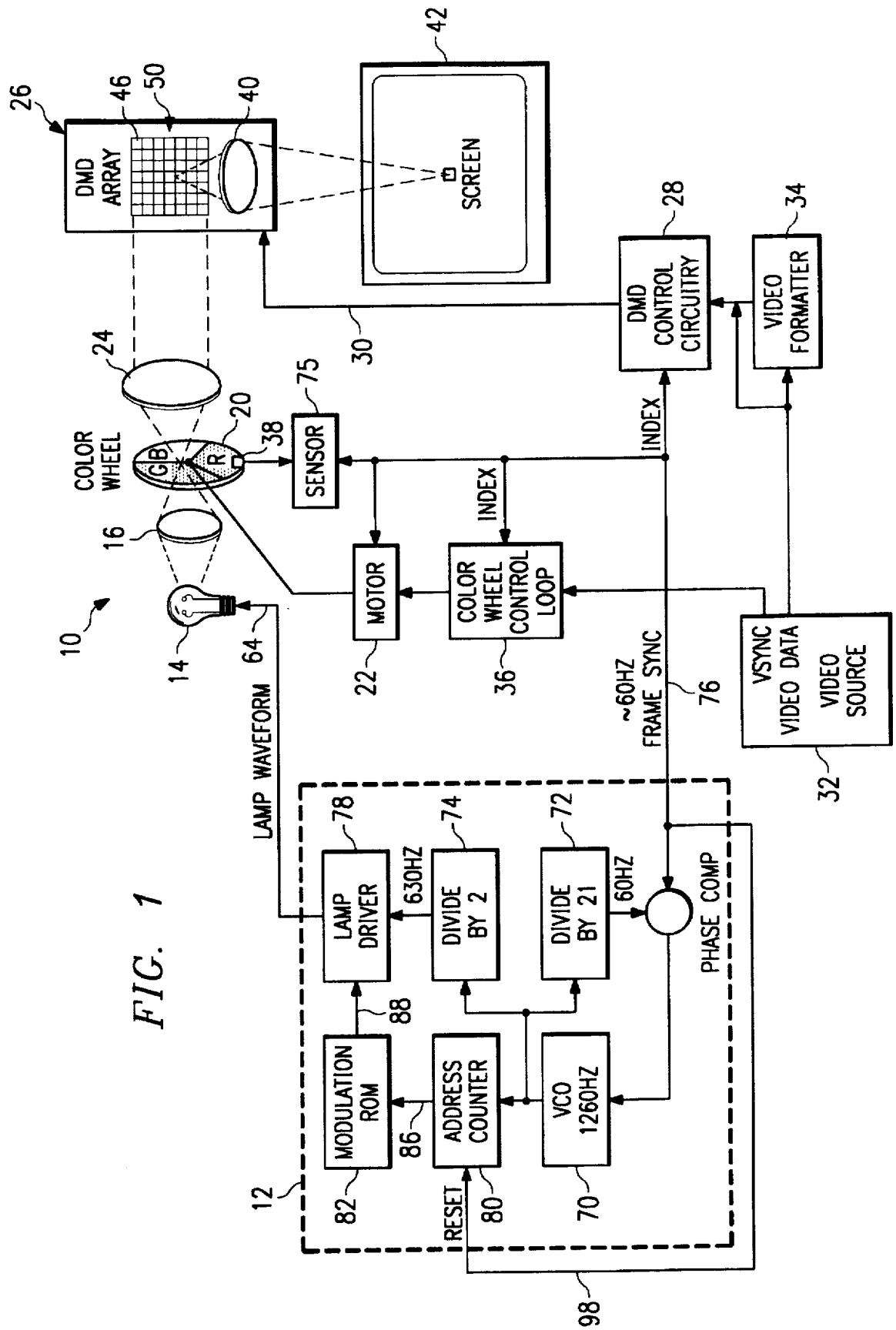
FIG. 1 is a block diagram of the a sequential color image display system including control circuitry controllably driving and amplitude modulating a single light source at a switching frequency being a multiple of the color wheel rotation frequency.

Referring now to FIG. 1, a block diagram of a sequential color image display system according to the preferred embodiment of the present invention is generally shown at 10. Image display system 10 is seen to include control circuitry 12 controlling the illumination portion of imaging system 10. Control circuitry 12 controls and drives an AC powered light source 14 comprising, for instance, a xenon or metal halide arc lamp. Light emitted from lamp 14 is focused by a lens 16 onto an upper section of a rotating color wheel 20, as shown. Color wheel 20 includes a plurality of colored segments, shown by way of illustration as a red segment (R), a green segment (G), and a blue segment (B), these segments sequentially being rotated into the light path as color wheel 20 is rotated therepast. Light from lamp 14 is focused by lens 16 onto the color wheel, with the color wheel being positioned near the focal point of lens 16 to minimize the area of the color wheel 20 being illuminated.

If the size of the area illuminated is increased, the proportion of time that the illuminated area includes more than one color increases. The efficiency of the projection system is limited by the proportion of time that the illuminated area includes more than one color, because the projector typically can not operate during any period when more than one color is produced by the color wheel, also referred to as an "off" period. This "off" period is commonly known as the blanking window. The disadvantage of placing the color wheel at the focal point is that the heat generated by light absorption is localized. This results in much higher temperatures, especially if the wheel is stopped. The color wheel may be placed away from the focal point in order to trade off the efficiency for lower thermal stress. For a more detailed discussion of sequential color systems and various color wheels suitable for use in the present invention, cross reference is made to U.S. Pat. No. 5,371,543 to Anderson, entitled "Monolithic Color Wheel", and U.S. patent application Ser. No. 08/179,028 entitled "Method and Apparatus for Sequential Color Imaging" each being assigned to the same assignee as the present invention, and the teachings included herein by reference.

A motor 22 turns the color wheel 20, the light of the desired colors is transmitted to a lens 24. Lens 24 focuses the colored light onto, and illuminates, a spatial light modulator (SLM) generally shown at 26. SLM 26 creates a light image from the incident light, and could be any type of device capable of modulating the incident light, such as a liquid crystal device (LCD) or a digital micromirror device (DMD). In the preferred embodiment of the present invention, SLM 26 is comprised of a DMD type SLM such as that manufactured by Texas Instruments Incorporated of Dallas Tex., which is disclosed in the commonly assigned cross referenced patents discussed earlier in the section entitled Background of the Invention.

DMD control circuitry 28 provides address signals and pixel data to SLM 26 on line 30. The pixel data is either already in digital format from source 32 when provided to circuitry 28, or is digitized and formatted by a video format circuit 34 if it is in the analog domain. A color wheel control loop circuit 36 synchronizes the color wheel rate to the vertical sync signal VSYNC by controlling motor 22. The DMD control circuitry 28 addresses DMD 26 to display a frame of data in sync with the wheel sync signal INDEX, this signal being derived by sensing a wheel index marker 38 or from sensing a position of a drive shaft of motor 22, for instance. The light image generated by DMD 26 is focused by a projector lens 40 on a display screen 42.

Figure 2:
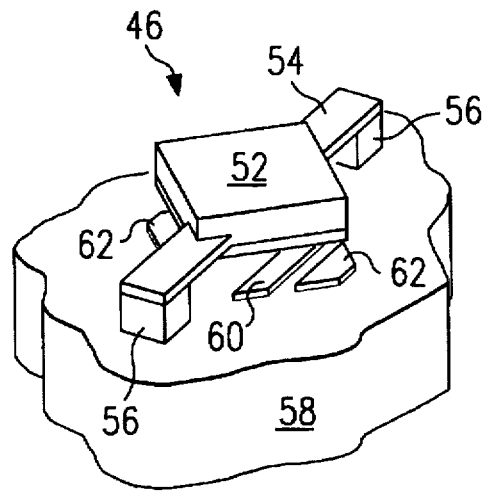
FIG. 2 is a perspective view of one pixel of the DMD spatial light modulator which the colored light source to a display screen.
Figure 3:
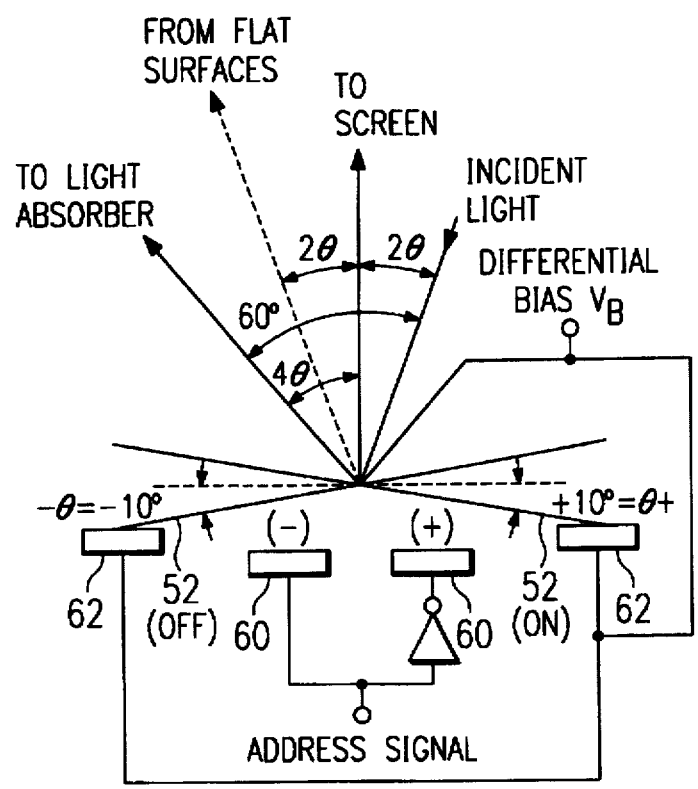
FIG. 3 is an illustration of the bistable pixel mirror of FIG. 2 which is controllably deflected to either reflect incident light to the screen or to a light absorber as a function of an address signal.

Referring to FIG. 2 and FIG. 3, a basic DMD pixel 46 comprising one of thousands of pixels of an area array 50 of SLM 26 is shown. The basic DMD pixel 46 is shown in FIG. 2, and the bistable operation for light modulation of incident light is shown in FIG. 3. Each pixel 46 comprises a deflectable mirror 52 supported by a pair of colinear hinges 54 and support posts 56 above an addressing substrate 58. Substrate 58 supports a corresponding pair of addressing electrodes 60 driven by an underlying SRAM cell (not shown), and mirror tip landing pads 62. Switching control electronics 28, shown in FIG. 1, provides voltages indicative of pixel data to addressing electrodes 60 via the SRAM cell, to electrostatically deflect mirror 52.

Referring to FIG. 3, each bistable mirror 52 of DMD 26 can rotate plus/minus 10° (θ) between an on and off position, either directing incident light from lens 24 to or away from a projector lens 40, shown in FIG. 1. The DMD is a monolithic single-chip semiconductor device which is fabricated using robust semiconductor processing techniques. Each pixel mirror 52 is approximately 17 microns square, with array 50 comprising thousands of such mirrors, such as 1,280×2,048 pixel mirrors for a high definition HDTV display. Light reflected by each pixel mirror is focused by projector lens 40 onto projection screen 42 as shown in FIG. 1. If each pixel mirror 52 of pixel 46 is in the on position, the image focused to screen 42 is observed as an array of bright pixels.

For a more detailed discussion of the DMD device, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image is achieved by pulse width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

Referring now back to FIG. 1, a detailed discussion of control circuitry 12 of the associated sequential color system 10 will be discussed in considerable detail. In a typical display system, 60 frames of video are projected by SLM 26 to screen 42 each second. This assures that the image projected to screen 42 appears as a continuously projected image due to the human eye's ability to integrate sequentially projected discrete frame images. For purposes of illustration and according to the preferred embodiment of the present invention, color wheel 20 is rotated by motor 22 sixty (60) times a second, or 60 hertz. At this rate, light is projected for a predetermined duration through each colored segment of wheel 20, and any combination thereof, to effect the color of each pixel for a particular frame image. Because the human eye viewing screen 42 operates as a light and color integrator, the duration that each color is projected by mirror 52 of each pixel 46 to the screen determines the ultimate perceived color, and intensity, of the pixels. To reduce the artifact known as color separation, the number of colored segments, and the orientation thereof, can be modified from that shown, such as disclosed in the commonly assigned cross referenced patent application Ser. No. 08/179,028, filed Jan. 7, 1994, entitled "Method and Apparatus for Sequential Color Imaging" incorporated herein by reference.

According to the preferred embodiment of the present invention, control circuit 12 avoids generating perceived color shift bands rolling in the video frame by synchronizing the switching frequency of the AC lamp waveform driving lamp 14 with the rotation rate of color wheel 20. Sensing of the wheel position is accomplished by sensing an index marker 38 located at the periphery of the red segment. The switching frequency is an odd multiple of the color wheel rate divided-by-two. This creates a phase shift in the amplitude of the colored light for sequential colored segments of like color, to cancel color bands through integration performed by the human eye. The DMD control circuitry 28 synchronizes addressing signals on line 30 to the position of color wheel 20.

To avoid the switching frequency of the lamp power supply provided on line 64 from beating with the 60 hertz video frame rate, which would otherwise cause a noticeable artifact as brightness variations due to power supply ripple roll through the video frame, the switching frequency of the lamp waveform on line 64 is much higher than, and multiple of, the color wheel rotation frequency of 60 hertz. In the preferred embodiment, as will be discussed in more detail shortly, the frequency of the lamp power waveform is a 10.5 multiple of the 60 hertz color wheel rate, or 630 hertz. That is, there are 10.5 switching cycles (21 transitions) per wheel rotation, and thus the power supply switching frequency is 630 hertz.

Moreover, the switching frequency of the lamp power supply is an odd multiple of the color wheel rate divided-by-two, whereby there are 21 switching cycles for every two video flames. By synchronizing the lamp waveform switching frequency to the color wheel rate, the beat frequency is reduced to zero. By operating the lamp supply switching frequency at an odd multiple divided-by-two of the color wheel frequency, any lamp output variations due to the lamp power supply ripples are perceived to be canceled by the alternating ripple phase, this cancellation occurring through integration of the human eye. As will also be described shortly, the amplitude of the lamp power supply waveform is modulated by a lamp modulation envelope. This allows color balance to be achieved without a loss in light efficiency, or incurring the timing complications associated with using unequal size segments of a color wheel. As will be discussed shortly in regards to the alternative preferred embodiment of FIG. 5, the power supply ripples can also be cancelled according to a method without providing a lamp modulation envelope if desired.

Briefly summarizing, the sequential color image display system 10 achieves technical advantages by synchronizing the lamp power supply switching rate to a multiple of the color wheel rate. This prevents the power supply switching rate from beating with the frame rate to eliminate rolling of color bands through an image, and produces a stationary power supply ripple pattern. By choosing an odd number of switching cycles per two video frame periods, i.e. an integer-and-a-half switching cycles per video frame, the phase of the ripple pattern is alternated frame-to-frame for sequential color wheel segments of like color to achieve ripple cancellation through integration, this integration being preformed by the human eye. By also providing a modulation envelope phase locked to the color segments on the color wheel to amplitude modulate the lamp drive waveform, white balance of a lamp that has spectral deficiencies can be achieved, i.e., deficient in red light. The lamp is pulsed on brighter when light is colored by the red color wheel segment, and reduced in brightness a predetermined amount when light is colored by the blue and green segments to maintain an equal intensity across the color spectrum and producing the proper color balance.

Referring again now to FIG. 1, a detailed discussion of control circuitry 12 will be provided. Control circuitry 12 includes a voltage controlled oscillator (VCO) 70 running at 1,260 hertz, and being phase-locked to the 60 hertz color wheel rate using a divide-by-21 counter 72 in the loop. The VCO frequency is divided by a divide-by-two counter 74 to produce a synchronized lamp power supply switching waveform 77 at a rate of 630 hertz. The VCO 70 remains phase-locked to the color wheel 20 by sensing the FRAME SYNC signal generated by optical sensor 75 and provided on reference line 76, this signal corresponding to the sensed index marker 38 of wheel 20. The DMD control circuitry 28 controls the light imaging of DMD array 26, and synchronizes the frame generation of the DMD array 26 with color wheel 20. Control circuitry 28 includes column data load shift registers and row address logic, this control logic being discussed in the commonly assigned co-pending patent application Ser. No. 08/373,692 entitled "Monolithic Programmable Digital Micro-Mirror Device", incorporated herein by reference, and other previously referenced commonly assigned DMD patents and applications.

The synchronized 630 hertz waveform 77 is provided by counter 74 to a lamp driver circuit 78, which circuit in turn amplifies and provides the lamp waveform to drive lamp 14 switching at 630 hertz. Amplitude modulation of the lamp waveform is achieved using, in combination, an address counter 80 and a modulation ROM 82.

Figure 4:
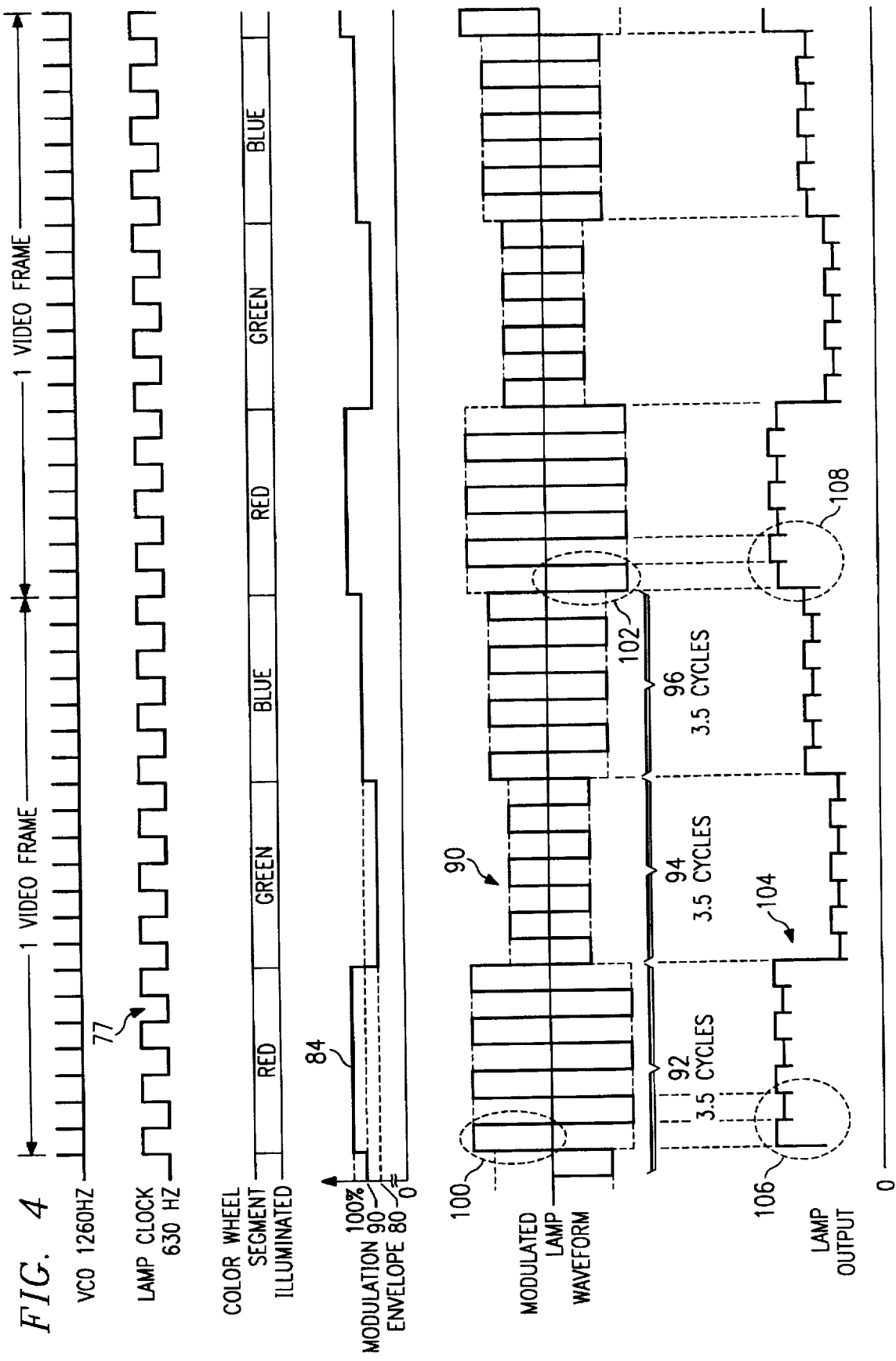
FIG. 4 is a waveform diagram illustrating the synchronization of the light source power supply switching frequency to the color wheel rotation rate, and also illustrating the amplitude modulation of the light source power supply driving waveform as a function of which color segment is coloring the light source to achieve color balance, with the phase of the lamp output alternating for sequential color segments of like color.

Referring to FIG. 4, address counter 80 counts the clocks of VCO 70, the output of this counter being fed on line 86 to the input of ROM 82. ROM 82 is programmed to serve as a look-up table, and provides a modulation envelope 84 on line 88 to lamp driver 78 as a function of the count from counter 80 on input line 86. The modulation envelope 84 provided on line 88 amplitude modulates the lamp driving waveform provided to line 64, this waveform being shown at 90. This modulation envelope is synchronized to the position of color wheel segments, namely, the red, green and blue segments as shown in FIG. 4. This technique achieves white balance of a lamp 14 that has spectral deficiencies. As shown by way of illustration for the first seven (7) counts of address counter 80, corresponding to the red segment coloring the light from lamp 14, modulation ROM 82 generates the modulation envelope at 100% causing the lamp driver 78 to generate an AC lamp waveform on line 64 at 100% amplitude as shown at region 92 in FIG. 4. If lamp 14 is a 50 watt lamp, for instance, lamp 14 is driven at 50 watts during the period 92.

For the next seven (7) counts, namely, count 8 through 14, corresponding to the green color wheel segment coloring the light from lamp 14, modulation ROM 82 generates modulation envelope output at 80% of a maximum value. At 80%, lamp driver 78 generates an AC lamp waveform on line 64 at 80% of maximum, shown during window 94. If the lamp is a 50 watt lamp, the power output is 40 watts. For the last seven (7) counts, namely, count 15 through 21, corresponding to the blue segment of color wheel coloring light from lamp 14, modulation ROM 82 provides modulation envelope 84 at 90% of maximum. At 90% lamp driver 78 generates the AC lamp waveform 90 on line 64 at 90% maximum amplitude, shown as segment 96 in FIG. 4, which is 45 watts in this example. Address counter 80 resets back to zero upon each detection of the FRAME SYNC signal provided on reset line 98. Thus, modulation ROM 82 remains synced to the color wheel 20 since the address counter 80 resets with every FRAME SYNC pulse.

Modulation ROM 82 is programmable, and can be custom programmed to compensate for the spectral deficiencies of a chosen lamp 14. For instance, if a lamp 14 is chosen that is significantly deficient in the green region, somewhat deficient in the red region and sufficient in the blue region, modulation ROM 82 can provide a modulation envelope 84 that has 100% maximum amplitude corresponding to the green color wheel segment, 90% of maximum amplitude corresponding to the red color wheel segment, and 80% of maximum corresponding to the blue color wheel segment. By characterizing the spectral characteristics of lamp 14, the ROM 82 can be programmed to provide the optimum modulation envelope as a function of the address counter 80. ROM 82 includes a D/A to generate the analog output signal.

Still referring to FIG. 4, it can be seen that the modulated lamp waveform 90 provided to line 64 has 3.5 switch cycles (7 transitions) for each color wheel segment. Thus, the leading edge of the lamp waveform alternates between being a "positive going" and a "negative going" waveform for each color segment on subsequent passes. As shown at 100, the waveform is "positive going" at the beginning of the red color wheel segment, and is "negative going" as shown at 102 the next time the red color wheel segment is present. By alternating the phase of the modulated lamp waveform 90, as shown, each time a particular color wheel segment appears, any generated power supply ripple will be canceled by integration of the human eye. The lamp output shown at 104 illustrates the ripple as a square wave, with negative spikes where the lamp waveform 90 changes polarity. DMD control circuitry 28 will avoid using the spike portion of the lamp waveform 104. Comparison of the lamp output 104 during the two red segments, shown at 106 and 108, illustrates the ripple cancellation principle.

Figure 5:
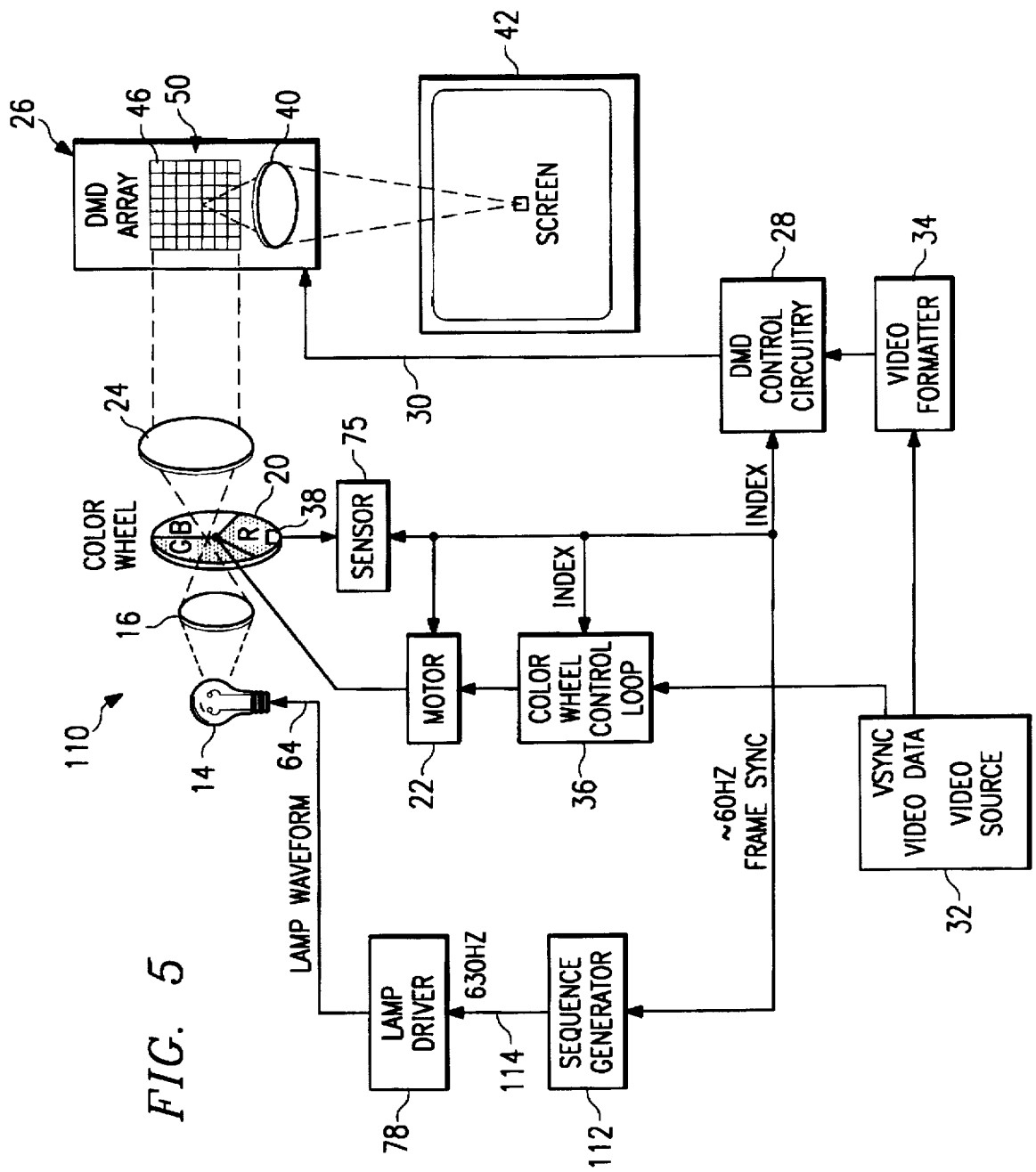
FIG. 5 is a block diagram of an alternative preferred embodiment of the present invention whereby a sequence generator is utilized to synchronize the lamp power supply switching frequency for an AC powered lamp to the color wheel rotation frequency to eliminate color rolls through a video frame.
Figure 6:
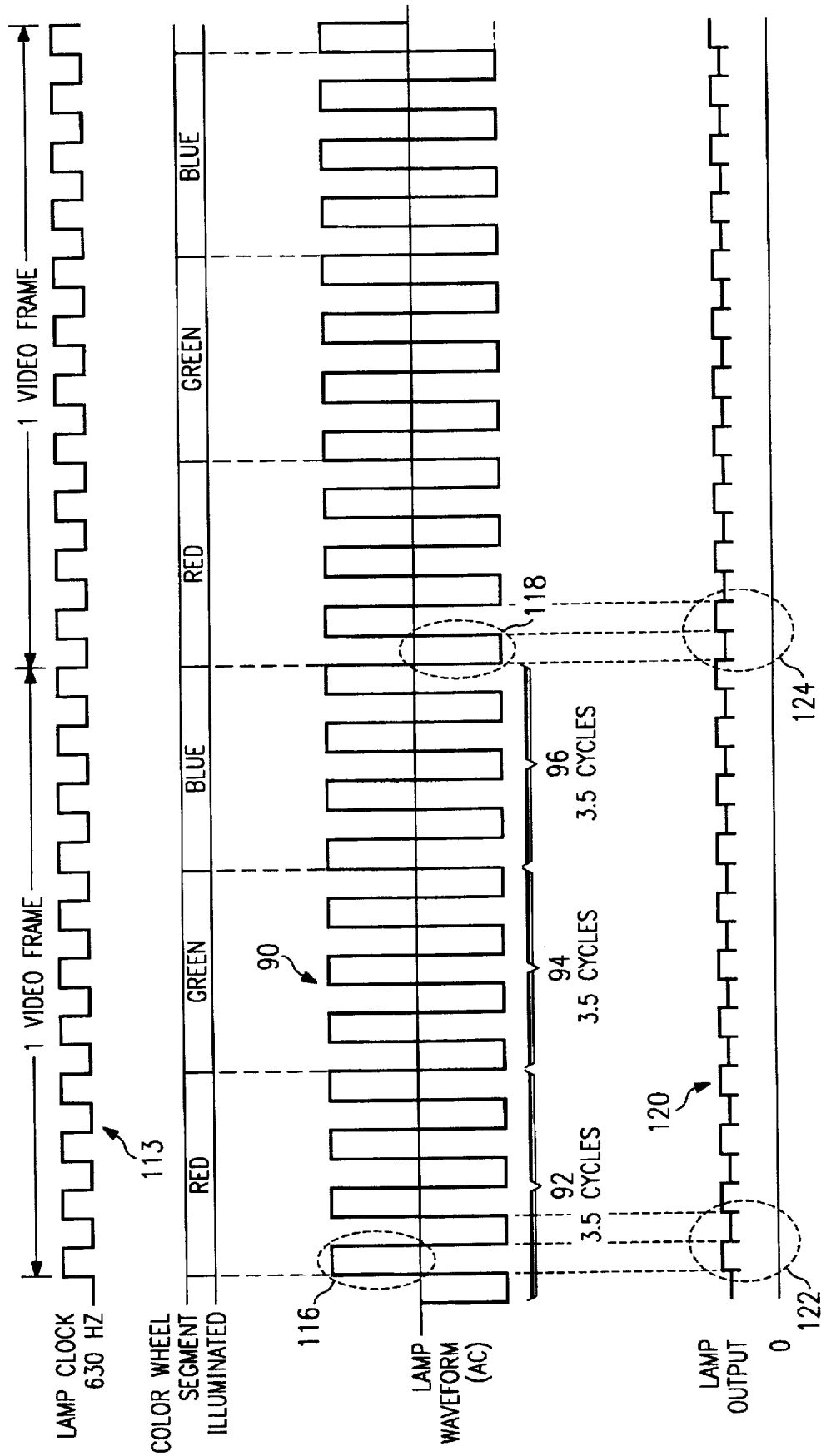
FIG. 6 is a waveform diagram of the embodiment of FIG. 5 illustrating the lamp power supply switching frequency being synchronized to the color wheel frequency, and being an odd multiple thereof, divided-by-two, where the phase of the lamp output alternates for sequential color segments of like color.

Referring now to FIG. 5, an alternative preferred embodiment of the color image display system is shown generally at 110, wherein like numerals refer to like elements. Image display system 110 is similar to image display system 10 described in reference to FIGS. 1–4, with the exception that control circuitry 12 is replaced with a sequence generator 112 and a lamp driver 78. Sequence generator 112 comprises a 21-state counter clocked by a sub-multiple of a high frequency crystal oscillator. The generator 112 is synchronized to the FRAME SYNC operating at 60 hertz by being reset by each pulse of FRAME SYNC. Sequence generator 112 provides a 630 Hz clock waveform 113 to driver 78 that is synchronized to color wheel 20, as shown by the waveform diagram shown in FIG. 6. Lamp driver 78 amplifies waveform 113, as shown. Sequence generator 112 generates 3.5 switch cycles (7 transitions) on line 114 per each color wheel segment, as previously described. This ensures that the leading edge of the lamp waveform 90 is alternating between a "positive going" waveform, shown at 116, and a "negative going" waveform shown at 118 each time a particular color wheel colored segment is sequentially illuminated, for each color wheel segment. Consequently, the phase of the lamp output, shown at 120, alternates as each particular colored segment is sequentially illuminated, as depicted at 122 and 124 for the red segment. This alternating phase of the colored light amplitude leads to cancellation of ripple through integration. Again, the lamp power supply switching rate provided on line 64 is significantly greater than, and a multiple of, the color wheel rate, in the this case, 10.5 times the rate of the color wheel. This ensures that there is integer number-and-a-half switching cycles per color segment to achieve ripple roll cancellation through integration. In this embodiment, the lamp waveform is not amplitude modulated, and spectral deficiencies of the lamp 14 are uncompensated. However, sequence generator 112 is rather basic in design.

The color wheel 20 is maintained in synchronism with the vertical sync VSYNC signal at approximately 60 rotations per second, or 3600 rpm, by color wheel control loop 36 controlling motor 22 as a function of the detected wheel index marker 38. While wheel control loop 36 maintains a 60 hertz wheel rate by sensing wheel marker 38, is also to be recognized by those skilled in the art that other means for maintaining a controlled and synchronized wheel rate are available, such as by detecting a reference on motor 22, or by using a stepper motor 22. Color wheel control loop 36 synchronizes the color wheel rate to the vertical sync pulse VSYNC, which is integral with the video signal provided by source 32. The video data is provided to the video formatter for digitizing if the incoming video data is not already formatted in the digital domain, i.e., is an analog signal. It is this formatted signal that is provided to the DMD control circuitry 28 for driving DMD 26 and to be displayed on screen 42.

Figure 7:
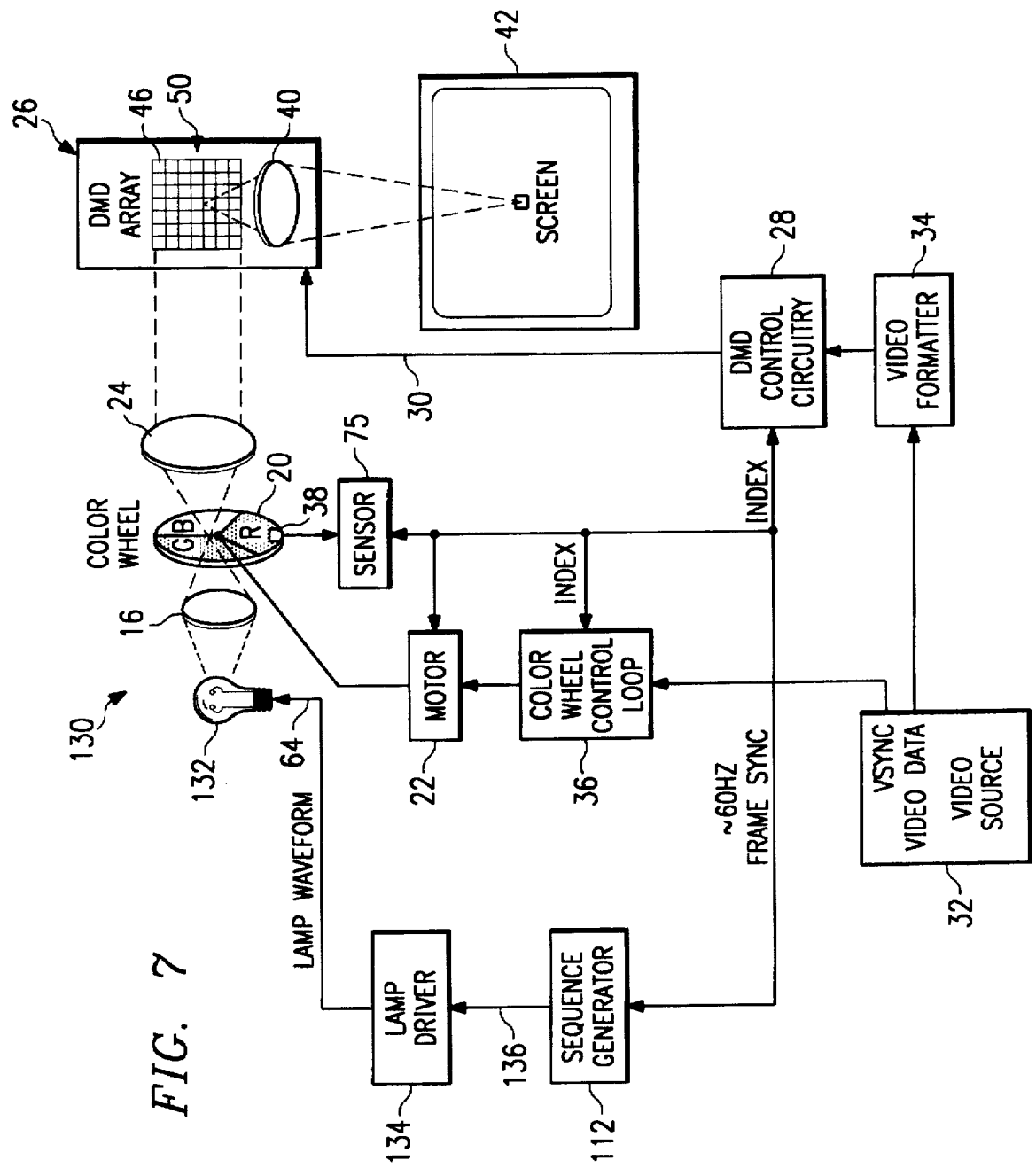
FIG. 7 is a block diagram of another alternative preferred embodiment of the present invention whereby a sequence generator is utilized to synchronize the lamp power supply switching frequency for a DC powered lamp to the color wheel rotation frequency, the lamp power supply waveform being rectified to drive the DC lamp.
Figure 8:
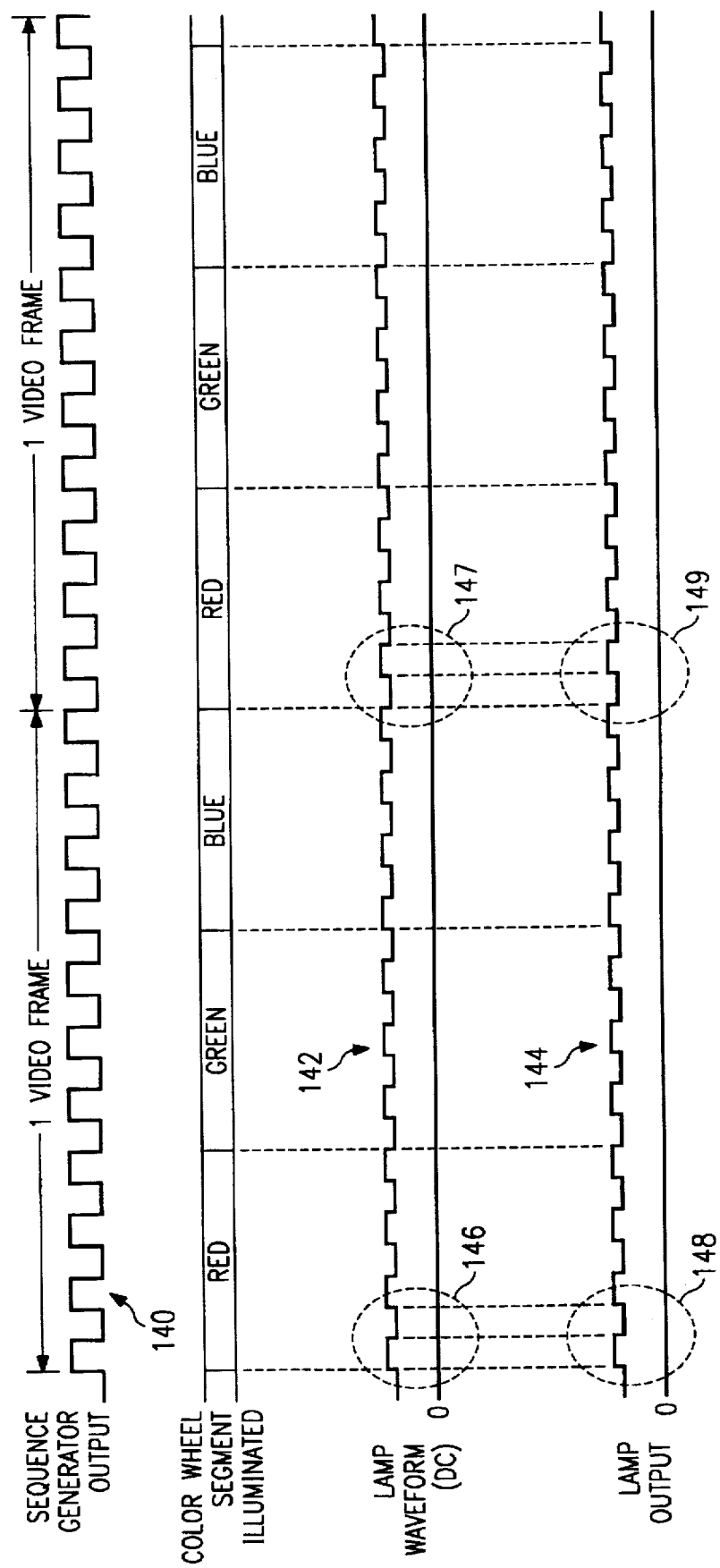
FIG. 8 is a waveform diagram of the embodiment of FIG. 7 illustrating the lamp power supply switching frequency being rectified such that the ripple component frequency is synchronized to the color wheel frequency, and being an odd multiple thereof divided-by-two, so that the phase of the lamp output associated with the ripple alternates for sequential color segments of like colors.

Referring now to FIG. 7, yet another alternative preferred embodiment of a color image display system is generally shown at 130, wherein like numerals referred to like elements. Image display system 130 is similar to image display system 110 shown in FIG. 5, however, a DC powered arc lamp 132 is used in place of the AC powered arc lamp 14. A lamp driver circuit 134 is responsive to the 21-state sequence generator 112, and both amplifies and rectifies the 630 hertz switching signal provided from the sequence generator 112 on line 136. Referring to FIG. 8, the synchronized 630 hertz switching output provided by sequence generator 112 is generally shown at 140. The amplified and rectified lamp waveform output by lamp driver circuit 134 on line 64 is shown generally at 142.

Referring specifically to the lamp waveform 142, an AC ripple component, shown as a square wave but may have other periodic shapes, is present in (carried by) the DC lamp waveform 142 due to the rectification of the 630 hertz switching frequency of the sequence generator output waveform 140. The intensity of the lamp output, shown generally at 144, has a corresponding intensity ripple also of 630 hertz. According to the present invention, the frequency of this lamp output ripple is synchronized to the 60 hertz frame rate because the sequence generator output 140 is synchronized to the frame rate. There are an odd number of ripples (seven) in the lamp waveform 142 and in the lamp output 144 for each color wheel segment being illuminated. Thus, cancellation through integration is still achieved since the phase of the lamp waveform and the lamp output alternates for sequential color segments of like color, as shown for the red segment at 146 and 147, and at 148 and 149, respectively.

Figure 9:
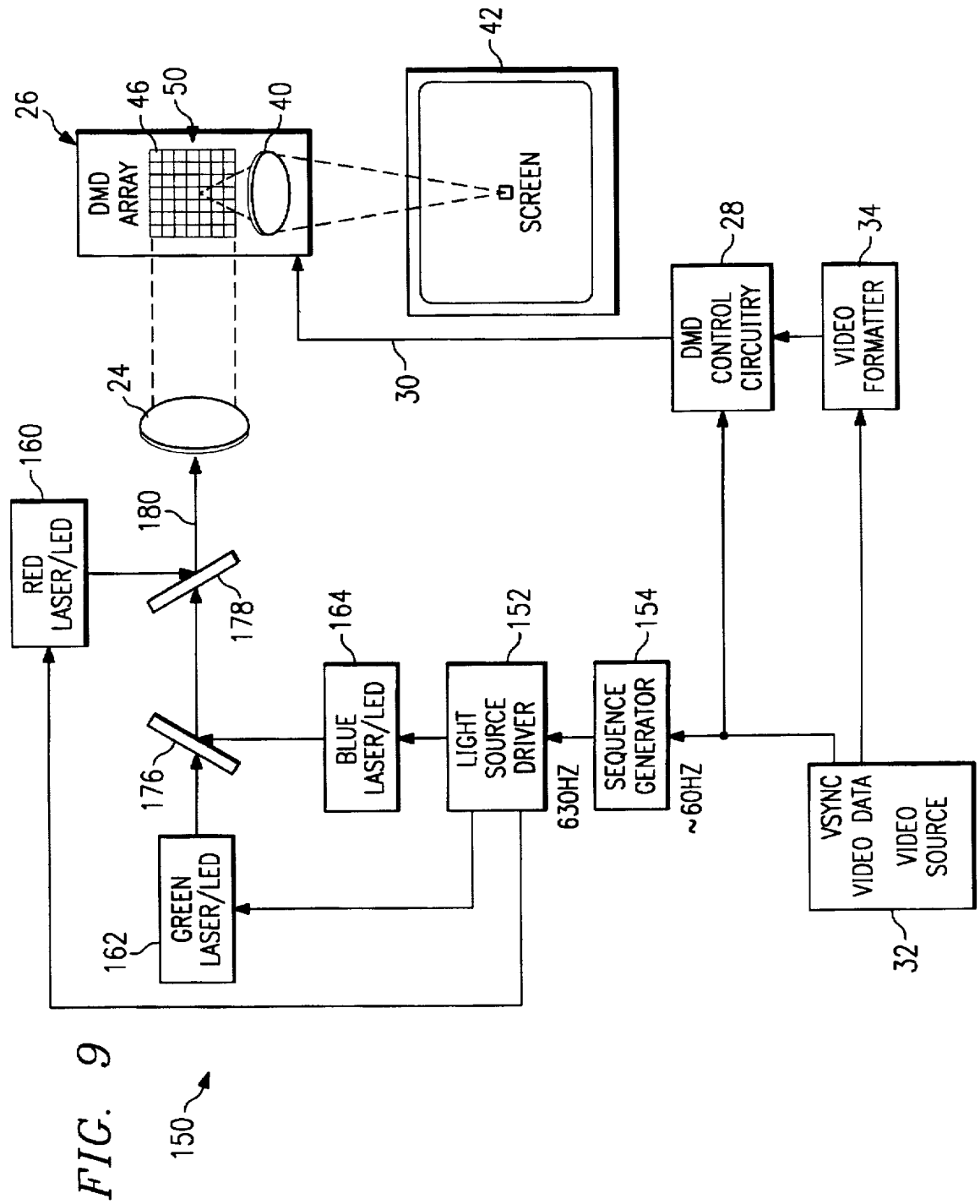
FIG. 9 is a block diagram of another alternative preferred embodiment of the present invention whereby three colored, DC powered, lasers/LEDs are utilized in place of a color wheel, with a light source driver sequentially driving the three sources.

Referring now to FIG. 9, another alternative preferred embodiment of a color image display system is shown generally at 150, wherein like numerals refer to like elements. Image display system 150 is similar to image display system 130, however, the DC arc lamp 122 is replaced with three colored lasers or three colored LEDs. These three light sources are sequentially driven by a DC waveform provided by a light source driver 152. The VSYNC signal is connected to both DMD control circuitry 28, and to sequence generator 154. Each VSYNC pulse starts the video data write cycle of DMD circuitry 28, and also starts sequence generator 154 to maintain synchronism between the colored light sequencing and the light modulation of the DMD array 26.

Figure 10:
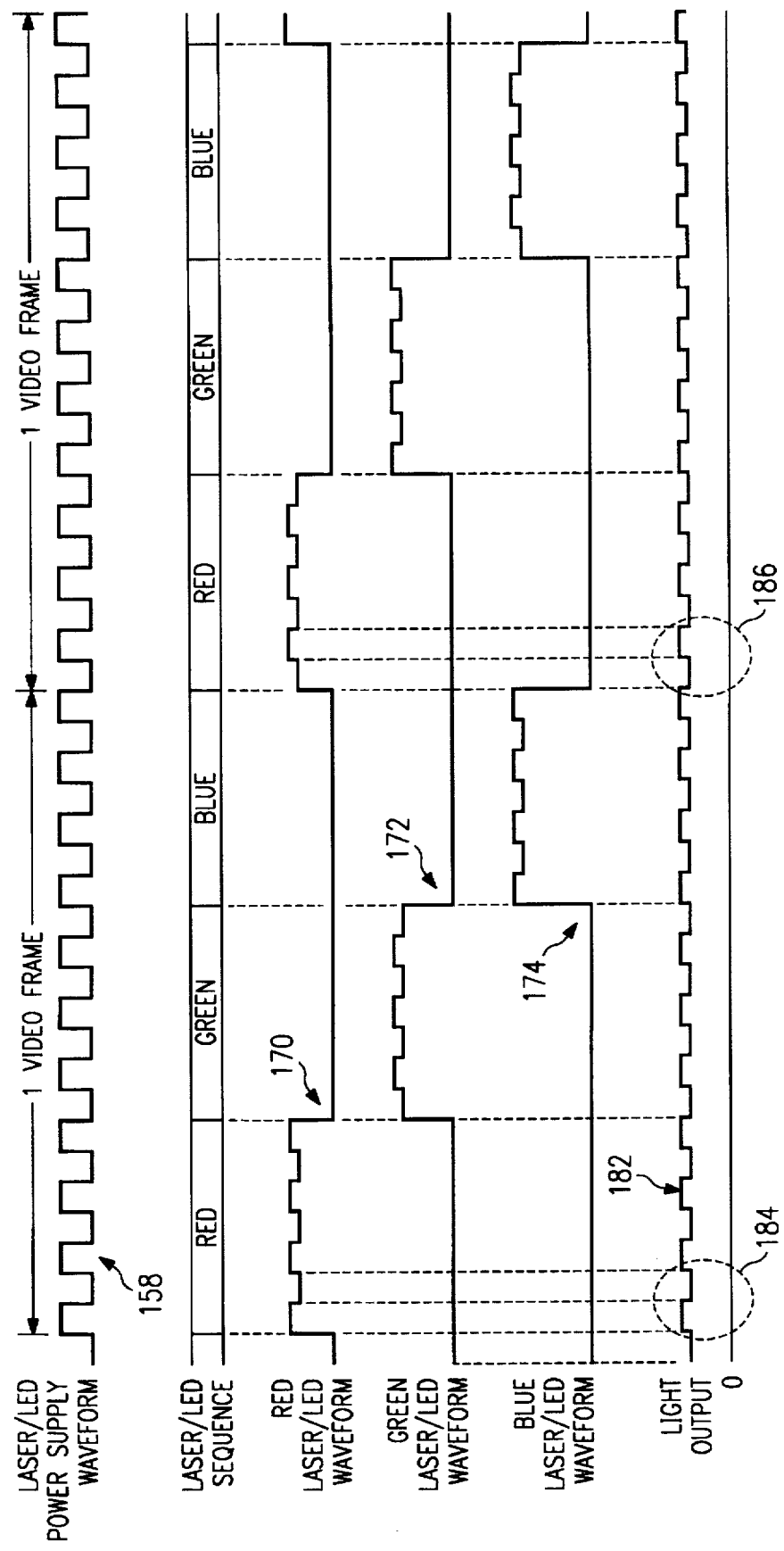
FIG. 10 is a waveform diagram of the embodiment of FIG. 9 illustrating the power supply switching waveform being rectified such that the ripple component in the waveform driving the respective light sources is synchronized to the video frame rate of the display, with the ripple alternating phases for sequential laser sequences of the color.

Referring to FIG. 10, sequence generator 154 provides a 630 hertz laser/LED power supply switching waveform synchronized to the VSYNC signal, generally shown at 158. Light source driver 152 amplifies and rectifies the 630 hertz switching signal 158, and sequentially provides a DC signal to a red laser/LED 160, a green laser/LED 162, and a blue laser/LED 164. This red laser/LED waveform is generally shown at 170, the green laser/LED waveform is generally shown at 172, and the blue laser/LED waveform is generally shown at 174. The AC ripple component in each waveform is, again, due to the rectification of the switching frequency of the AC source 158. A pair of dichroic mirrors 178 combine the beams of the three light sources, and direct the beams along optical path 180 to lens 24. This lens focuses the colored light onto, and illuminates the spatial light modulator 26. The intensity of the colored light output provided on optical path 180 is generally shown at 182 in FIG. 10. This light output intensity will also have an undesirable 630 hertz intensity ripple component due to the ripple component in the waveforms 170, 172 and 174 driving each of the light sources 160, 162 and 164. However, the phase of the ripple pattern, as illustrated at 184 and 186 for sequential segments of like color will alternate, achieving cancellation through integration. Again, this 630 hertz intensity ripple component is synchronized to the 60 hertz video frame rate, and thus, colored bands will not be observed to roll through the video frame. The laser/LED waveforms 170, 172 and 174 could also be amplitude modulated for color balance, such as set forth earlier in reference to FIGS. 1–4 if desired.

In each of the embodiments disclosed, the waveform driving the light source has a switching frequency component that is synchronized to, and a multiple of the video frame rate. The ripple component of the driving waveform may be the AC driving waveform as disclosed in reference to FIGS. 1–6, or an AC ripple on a DC driving waveform as disclosed in reference to FIGS. 7–10. Thus, any ripple in intensity that may be produced by the light source is also synchronized to the video frame rate, and thus will not beat with the video frame rate. The intensity variations are cancelled through integration by alternating the phase of the lamp output for sequential color segments of like color.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications. For instance two or more spatial light modulators could be used in a non-sequential color image display system each modulator having an associated light source controlled according to the present invention to avoid color bands and achieve color balance. Hence, limitation to a sequential color image display system is not to be inferred.

We claim:

1. A sequential image display system, comprising:
   (a) a modulation circuit providing a modulation envelope;
   (b) a driver circuit providing a driving waveform amplitude modulated by said modulation envelope;
   (c) a light source generating light from said amplitude modulated driving waveform;
   (d) a rotatable color wheel having multiple color segments transmitting and coloring said light, said color wheel rotating to sequentially position said color segments before said light source; and
   (e) a spatial light modulator modulating said colored light.

2. The image display system as specified in claim 1 wherein said modulation circuit comprises a memory device providing said modulation envelope.

3. The image display system as specified in claim 2 wherein said memory device has a memory input and generates said modulation envelope as a function of a wheel position signal provided to said memory input.

4. The image display system as specified in claim 3 further comprising a wheel position circuit generating said wheel position signal as a function of said color wheel position.

5. The image display system as specified in claim 4 wherein said wheel position circuit comprises a wheel index marker and sensor, and a counter circuit generating said wheel position signal as a function of said sensed wheel index marker.

6. A sequential image display system, comprising:

(a) a driver circuit providing a driving waveform having a component switching at a first frequency;

(b) a light source generating light from said driving waveform;

(c) a rotatable color wheel having multiple color segments transmitting and coloring said light, said color wheel rotating to sequentially position said color segments before said light source and establishing a color field rate;

(d) a spatial light modulator modulating said colored light; and (e) a synchronization circuit establishing said driving waveform first frequency as an odd multiple divided-by-two of said color field rate, said synchronization circuit comprising a sequence generator generating a first signal as a function of the color wheel position, said driver circuit providing said driving waveform of said first frequency as a function of said first signal.

7. A sequential image display system, comprising:

(a) a driver circuit providing a driving waveform having a component switching at a first frequency;

(b) a light source generating light from said driving waveform;

(c) a rotatable color wheel having multiple color segments transmitting and coloring said light, said color wheel rotating to sequentially position said color segments before said light source and establishing a color field rate;

(d) a spatial light modulator modulating said colored light; and (e) a synchronization circuit establishing said driving waveform first frequency as an odd multiple divided-by-two of said color field rate, said synchronization circuit comprising a phase-locked control circuit providing a sync output.

8. The image display system as specified in claim 7 wherein said phase-locked control circuit comprises a voltage controlled oscillator phase locked to said color wheel.

9. The image display system as specified in claim 7 further comprising a memory device providing a first input as a function of said sync output, said driver circuit driving said light source with said driving waveform at said first frequency as a function of said first input.

10. The image display system as specified in claim 7 wherein said driver circuit varies an amplitude of said driving waveform as a function of the particular said color segment coloring said light.

11. A sequential imaging system, comprising:

(a) a driver circuit providing a driving waveform having a component switching at a first frequency;

(b) a light source generating light from said driving waveform;

(c) a rotatable color wheel having multiple color segments transmitting and coloring said light, said color wheel rotating to sequentially position said color segments before said light source and establishing a color field rate;

(d) a spatial light modulator modulating said colored light; and (e) a control circuit establishing said driving waveform first frequency as an odd multiple divided-by-two of said color field rate, whereby said driving waveform component alternates phases for like said sequential color segments.

12. The image display system as specified in claim 11 wherein said driving waveform first frequency is 630 HZ, and said color field rate is 180 frames/second.

13. The image display system as specified in claim 1 wherein said driving waveform is AC.

14. The image display system as specified in claim 1 wherein said driving waveform is DC.

15. The image display system as specified in claim 1 wherein said light source is a laser.

16. The image display system as specified in claim 1 wherein said light source is an LED.

17. An image display system, comprising:

(a) a driver circuit providing an AC driving waveform switching at a first frequency;

(b) a light source generating colored light from said driving waveform;

(c) a spatial light modulator modulating said colored light to create frame images at a second frequency; and (d) a control circuit establishing said driving waveform first frequency as an odd multiple divided-by-two of said second frequency.

18. The image display system as specified in claim 17 wherein said light source generates said light with a variable intensity being a function of a first input, said control circuit generating said first input.

19. The image display system as specified in claim 17 wherein said light source comprises a plurality of lights of different colors, said lights being sequentially driven by said driver circuit.

20. The image display system as specified in claim 17 wherein said light source comprises a light illuminating a rotatable color wheel having multiple colored segments.

21. The image display system as specified in claim 19 wherein said lights each comprise a laser.

22. The image display system as specified in claim 19 wherein said lights each comprise a LED.

23. A method of operating an image display system, comprising the steps of (a) rotating a color wheel having a plurality of colored segments at a first frequency;

(b) illuminating said color wheel with a light source output having an intensity component varying at a second frequency, said component second frequency being a multiple of said color wheel first frequency to color said light source output, said multiple being greater than one; and (c) modulating said colored light source output with a spatial light modulator.

24. The method as specified in claim 23 further comprising the step of:

(d) controlling an intensity of said light source output as a function of the particular said color segment coloring said light source output.

25. The method as specified in claim 24 further comprising the step of:

(e) synchronizing said light source output component second frequency with said color wheel first frequency.

26. The method as specified in claim 23 wherein said light source output component second frequency is an odd multiple of said color wheel first frequency, divided-by-two.

27. A method of operating an image display system, comprising the steps of:
(a) driving a light source with an amplitude modulated waveform to generate a varying intensity light source output;
b) filtering said light source output to create colored light whereby the intensity of said light source output is synchronized with said filtering step; and
c) modulating said colored light with a spatial light modulator.

28. A method of operating an image display system, comprising the steps of:
a) generating colored light having an intensity varying at a first frequency; and
b) modulating said colored light to create frame images at a second frequency, wherein said first frequency is an odd multiple divided-by-two of said second frequency.

29. An image display system, comprising:
(a) a driver circuit providing a DC driving waveform having an AC component switching at a first frequency;
(b) a light source generating colored light from said driving waveform;
(c) a spatial light modulator modulating said colored light to create frame images at a second frequency; and
(d) a control circuit establishing said driving waveform first frequency as a multiple of said second frequency, said multiple being greater than one.

30. The image display system as specified in claim 29 wherein said AC component first frequency is an odd multiple of said second frequency, divided-by-two.

31. An image display system, comprising:
(a) a modulation circuit providing a modulation envelope;
(b) a driver circuit providing a driving waveform amplitude modulated by said modulation envelope;
(c) a light source generating colored light from said amplitude modulated driving waveform; and
(d) a spatial light modulator modulating said colored light to create frame images.

* * * * *